United States Patent
Zuscik

(10) Patent No.: US 10,787,053 B2
(45) Date of Patent: Sep. 29, 2020

(54) DAMPING SYSTEM OF A TWO-TRACK VEHICLE

(71) Applicant: Bayerische Motoren Werke Aktiengesellschaft, Munich (DE)

(72) Inventor: Marian Zuscik, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 270 days.

(21) Appl. No.: 15/843,036

(22) Filed: Dec. 15, 2017

(65) Prior Publication Data

US 2018/0105008 A1    Apr. 19, 2018

Related U.S. Application Data

(63) Continuation of application No. PCT/EP2016/070415, filed on Aug. 30, 2016.

(30) Foreign Application Priority Data

Sep. 7, 2015 (DE) ........................ 10 2015 217 057

(51) Int. Cl.
*B60G 21/05* (2006.01)
*B60G 21/055* (2006.01)
(Continued)

(52) U.S. Cl.
CPC ....... *B60G 17/0157* (2013.01); *B60G 13/003* (2013.01); *B60G 13/08* (2013.01);
(Continued)

(58) Field of Classification Search
CPC ....... B60G 11/183; B60G 11/50; B60G 11/64; B60G 13/00; B60G 13/003; B60G 17/00;
(Continued)

(56) References Cited

U.S. PATENT DOCUMENTS 5,231,583 A * 7/1993 Lizell .................. B60G 17/015
280/5.506
5,938,247 A * 8/1999 Santhuff ................ B60G 21/05
280/124.13
(Continued)

FOREIGN PATENT DOCUMENTS

DE         102 37 439 A1    3/2003
DE   10 2004 030 466 A1    3/2006
(Continued)

OTHER PUBLICATIONS

German Search Report issued in counterpart German Application No. 10 2015 217 057.8 dated Jun. 2, 2016 with partial English-language translation (Seventeen (17) pages).
(Continued)

*Primary Examiner* — Barry Gooden, Jr.
(74) *Attorney, Agent, or Firm* — Crowell & Moring LLP

(57) ABSTRACT

A damping system of a two-track vehicle includes a passive stabilizer having a torsion bar which runs in a vehicle transverse direction and having lever elements which adjoin the torsion bar at the end sides and which are connected to mutually oppositely situated wheel suspension arrangements of an axle of the vehicle. Two actuators are assigned to respective wheels of the wheel suspension arrangements and are mounted on the vehicle body. Each actuator has a drive by way of which a torque can be exerted on that section of the stabilizer which faces toward the respective wheel. Here, the actuators are in the form of electric motors and are designed to dampen vertical vibrations of the respective wheel or of the so-called unsprung mass, and/or vibrations of the vehicle body in a frequency range between 0 Hertz and at least 20 Hertz, through suitable regulation of the drive of the actuators and thus also through active introduction of forces into the system.

12 Claims, 3 Drawing Sheets

(51) Int. Cl.
*B60G 17/015* (2006.01)
*B60G 13/14* (2006.01)
*B60G 17/02* (2006.01)
*B60G 17/033* (2006.01)
*B60G 13/00* (2006.01)
*B60G 13/08* (2006.01)
*B60G 17/08* (2006.01)

(52) U.S. Cl.
CPC ............ *B60G 13/14* (2013.01); *B60G 17/025* (2013.01); *B60G 17/033* (2013.01); *B60G 17/08* (2013.01); *B60G 21/0553* (2013.01); *B60G 2202/22* (2013.01); *B60G 2202/42* (2013.01); *B60G 2202/442* (2013.01); *B60G 2204/128* (2013.01); *B60G 2204/1222* (2013.01); *B60G 2204/4191* (2013.01); *B60G 2204/82* (2013.01); *B60G 2204/8302* (2013.01); *B60G 2500/10* (2013.01); *B60G 2600/182* (2013.01); *B60G 2800/16* (2013.01)

(58) Field of Classification Search
CPC .. B60G 17/015; B60G 17/0157; B60G 17/05; B60G 17/0553; B60G 17/0555; B60G 21/00; B60G 21/026; B60G 21/0558; B60G 2202/42; B60G 2202/442; B60G 2204/122; B60G 2800/162; B60G 2800/912; B60G 2800/9122
See application file for complete search history.

(56) References Cited

U.S. PATENT DOCUMENTS

| | | | | |
|---|---|---|---|---|
| 6,152,467 A * | 11/2000 | Alesso | | B60G 3/225 280/124.13 |
| 6,394,240 B1 * | 5/2002 | Barwick | | B60G 21/0553 188/293 |
| 2002/0013645 A1 * | 1/2002 | Badenoch | | B60G 17/0162 701/37 |
| 2002/0121748 A1 * | 9/2002 | Ignatius | | B60G 21/0556 280/5.511 |
| 2002/0195791 A1 * | 12/2002 | Schmidt | | B60G 11/50 280/124.166 |
| 2003/0137090 A1 * | 7/2003 | Reichel | | B60G 21/0555 267/188 |
| 2004/0217569 A1 * | 11/2004 | Gradu | | B60G 21/0555 280/124.107 |
| 2005/0029722 A1 * | 2/2005 | Reichel | | B60G 21/0553 267/188 |
| 2006/0022424 A1 * | 2/2006 | Reynolds | | B60G 11/183 280/124.169 |
| 2007/0108707 A1 * | 5/2007 | Kobayashi | | B60G 21/0555 280/5.511 |
| 2010/0013174 A1 * | 1/2010 | Buma | | B60G 17/0157 280/5.507 |
| 2010/0013175 A1 * | 1/2010 | Maeda | | B60G 11/183 280/5.511 |
| 2010/0032912 A1 * | 2/2010 | Inoue | | B60G 11/27 280/5.502 |
| 2010/0207309 A1 | 8/2010 | Park | | |
| 2011/0049818 A1 * | 3/2011 | Van der Knaap | | B60G 21/051 280/5.508 |
| 2011/0278812 A1 * | 11/2011 | Ohletz | | B60G 11/183 280/124.106 |
| 2012/0303193 A1 * | 11/2012 | Gresser | | B60G 17/0157 701/22 |
| 2012/0313338 A1 * | 12/2012 | Kondo | | B60G 21/0555 280/124.106 |
| 2013/0291664 A1 * | 11/2013 | Freund | | B60G 21/0555 74/89 |
| 2014/0232083 A1 * | 8/2014 | Mohrlock | | B60G 17/025 280/124.166 |
| 2015/0094909 A1 * | 4/2015 | Illg | | B60G 17/0162 701/37 |
| 2015/0165862 A1 * | 6/2015 | Schindler | | B60G 17/025 280/124.109 |
| 2016/0001626 A1 * | 1/2016 | Illg | | B60G 17/018 280/5.521 |
| 2016/0185180 A1 | 6/2016 | Schmitt | | |
| 2018/0244126 A1 * | 8/2018 | Kim | | B60G 17/0162 |
| 2019/0100071 A1 * | 4/2019 | Tsiaras | | B60G 21/0553 |
| 2019/0184784 A1 * | 6/2019 | Park | | F16D 41/06 |

FOREIGN PATENT DOCUMENTS

| | | |
|---|---|---|
| DE | 10 2005 043 176 A1 | 3/2007 |
| DE | 10 2006 009 524 A1 | 9/2007 |
| DE | 10 2007 024 770 A1 | 11/2008 |
| DE | 10 2010 008 009 A1 | 11/2010 |
| DE | 10 2009 037 084 A1 | 2/2011 |
| DE | 10 2009 047 128 A1 | 5/2011 |
| DE | 10 2009 054 672 A1 | 6/2011 |
| DE | 10 2013 012 755 A1 | 2/2015 |
| DE | 10 2014 018 732 A1 | 6/2015 |
| DE | 10 2014 208 404 A1 | 12/2015 |
| EP | 1 512 560 A2 | 3/2005 |
| WO | WO 03/045719 A1 | 6/2003 |

OTHER PUBLICATIONS

International Search Report (PCT/ISA/210) issued in PCT Application No. PCT/EP2016/070415 dated Dec. 7, 2016 with English-language translation (Seven (7) pages).

German-language Written Opinion (PCT/ISA/237) issued in PCT Application No. PCT/EP2016/070415 dated Dec. 7, 2016 (Six (6) pages).

\* cited by examiner

DAMPING SYSTEM OF A TWO-TRACK VEHICLE

CROSS REFERENCE TO RELATED APPLICATIONS

This application is a continuation of PCT International Application No. PCT/EP2016/070415, filed Aug. 30, 2016, which claims priority under 35 U.S.C. § 119 from German Patent Application No. 10 2015 217 057.8, filed Sep. 7, 2015, the entire disclosures of which are herein expressly incorporated by reference.

BACKGROUND AND SUMMARY OF THE INVENTION

The invention relates to a damping system of a two-track vehicle and to a method for operating the damping system. DE 10 2006 009 524 A1 is considered to be the closest prior art.

In road vehicles or motor vehicles, hydraulic dampers for damping the vibrations of the vehicle body are usually installed, and sometimes also anti-roll stabilization systems which can in each case be of either passive (that is to say, reacting only to external forces) or semiactive or active configuration. In the case of semiactive systems, the reaction of the damper or an anti-roll bar which serves for anti-roll stabilization to a defined external force is variable, whereas active systems can themselves introduce forces into the system, that is to say into the wheel suspension system or systems.

DE 10 2014 208 404 A1 discloses one example for active dampers having a hydraulic pump which can be operated by an electric motor, for example a gerotor, the delivery direction of which can be switched over between the two operating chambers of a hydraulic damper cylinder/piston unit. A passive anti-roll bar is usually not provided in the case of a (customary) active anti-roll stabilization system with an anti-roll bar of split configuration, the halves of which can be twisted with respect to one another by means of an actuator which is connected in between, cf., for example, the prior art which is disclosed in DE 10 2014 018 732 A1. In contrast, for example, DE 10 2005 043 176 A1 discloses one example for coupling a passive anti-roll bar to an active anti-roll bar. Here, the coupling to the actuator of the anti-roll stabilization system is usually configured to be as soft as possible, as a result of which roll movements of the vehicle body can be influenced only up to approximately 5 Hz; partially responsible for said low frequency range is otherwise also the configuration of the actuators as hydraulic pivoting motors, the reaction time of which is systemically relatively low.

Furthermore, DE 10 2007 024 770 A1 discloses an active chassis for a motor vehicle. In the case of the wheel suspension system which is disclosed therein for in each case two wheels which lie opposite one another, each wheel is assigned an actuator for changing the ride height of the motor vehicle. Here, the actuator consists of an adjusting drive comprising an electric motor and a gear mechanism, and is connected to a sprung part of the chassis. Here, an angled-away torsion bar with torsion spring properties extends into the actuator as far as its end, in order to achieve a sufficient length of the torsion bar which acts on the sprung part in the vertical direction.

DE 10 2006 009 524 A1, which was mentioned at the outset, discloses a further arrangement of what is known therein as a single-piece torsion bar which counteracts undesired roll movements, pitch movements and/or yaw movements of the vehicle body, is first of all constructed like a (customary) transverse anti-roll bar, and consists of a torsion bar and two rotary limbs which adjoin on its two sides. In each case one actuator which is mounted on the vehicle body is provided in the transition region from the torsion bar to each rotary limb. The actuators can be configured as a controlled permanent magnetic coupling, as a controlled electromagnetic coupling, as a hydraulically controlled pivoting motor or as an adjustable Visco coupling. In the case where the actuators are couplings, this is a semiactive system, the reaction behavior of which to external forces is variable; however, the hydraulic pivoting motor which is disclosed in said known prior art can also react only to forces which are introduced by the vehicle body or the roadway, but cannot provide any force itself, since a pump which delivers the hydraulic medium would be required for this purpose.

The frequencies of vibrations of the vehicle body which can be damped by way of the known anti-roll bar arrangements lie in the order of magnitude of from 1 Hz to 5 Hz as is well known. Vertical vibrations of the wheels or what is known as the unsprung masses of the wheel suspension system (for example, with respect to the vehicle body) lie in the frequency range from 12 Hz to 30 Hz. In the known prior art, the known hydraulic vibration dampers (also called shock absorbers) are always provided for damping said vibrations, to be precise usually as passive dampers. However, active dampers (for example, as disclosed in DE 10 2014 208 404 A1 which is mentioned further above) are currently also being tested or developed.

Herein, an active damping system of a two-track vehicle is now to be indicated, which damping system is of simpler construction than the known active hydraulic vibration dampers and nevertheless can influence or damp vibrations of the vehicle body and/or the vehicle wheels or the unsprung masses of the vehicle wheel suspension system in an active manner, that is to say by the introduction of forces into the system up to the frequency range of at least 20 Hz.

For a damping system of a two-track vehicle comprising a passive anti-roll bar with a torsion bar which runs in the vehicle transverse direction and lever elements which adjoin said torsion bar on the end sides and are connected to the mutually opposite wheel suspension systems of an axle of the vehicle, with, furthermore, two actuators which are assigned to in each case one wheel of the wheel suspension system, are mounted on the vehicle body, and have in each case one drive, by way of which a torque can be applied to that section of the anti-roll bar which faces the respective wheel, said object is achieved in a manner wherein the actuators are configured as electric motors and are designed, by way of suitable regulation of their drive and therefore also by way of active introduction of forces into the system, to damp vertical vibrations of the respective vehicle wheel or what is known as the unsprung mass and/or vibrations of the vehicle body in each case in a frequency range between 0 Hz and at least 20 Hz. Advantageous embodiments and developments are described and claimed herein; furthermore, a method for operating a damping system according to the invention having at least one of the method features contained in the present documents is claimed.

Therefore, the object is achieved by way of an active damping system for a vehicle. This is, in particular, a two-track motor vehicle. The damping system comprises a passive anti-roll bar on at least one axle of the vehicle. As is customary, the passive anti-roll bar is arranged between two wheel suspension systems of an axle of the vehicle which lie opposite one another. This is, in particular, an independent wheel suspension system. The two ends of the anti-roll bar are connected to the unsprung masses of the vehicle. For example, a connection of the anti-roll bar to the wheel support or a wheel steering element (for example, a link) takes place.

Furthermore, the damping system according to the invention comprises an actuable actuator which makes it possible to introduce a force into the system on at least one axle of the vehicle, for each wheel of said axle. Said actuator has an electric motor drive. The drive is arranged to apply a torque to the anti-roll bar and, in particular, to that section of the anti-roll bar which faces the respective wheel. To this end, the anti-roll bar is preferably mounted in the actuator. The actuator for its part is fastened to the vehicle body. The term "vehicle body" is to be understood broadly here and comprises, for example, the body (that is to say, the vehicle superstructure), an axle carrier or subframe and auxiliary frame. As a result of the mounting of the anti-roll bar in the actuator, the actuator can replace a conventional rubber bearing or the like of the anti-roll bar, that is to say in general a conventional anti-roll bar bearing which makes a rotational movement of the anti-roll bar possible. Here, the anti-roll bar can be mounted with respect to the vehicle body merely via the two actuators (and therefore without conventional bearings); as an alternative, however, conventional anti-roll bar bearings can also still be provided in addition to the mounting of the anti-roll bar in the two actuators of the axle, in which anti-roll bar bearings the anti-roll bar or more precisely its torsion bar is supported rotatably on the vehicle body. Mechanical stresses are namely produced on the torsion bar as a result of the loading with a torque by way of the actuator, which mechanical stresses can load the actuator not only in the rotational direction but also in the axial direction and radial direction. Additional loads of this type can be kept low by way of additional conventional anti-roll bar bearings.

By an electric motor being provided as a drive of the actuator with a significantly shorter response time in comparison with hydraulic systems, vibrations in the frequency range between 0 Hz and 20 Hz can then be damped successfully by way of suitable regulation of said electric motor actuator drive, to be precise regardless of whether they are vibrations of the sprung mass, that is to say of the vehicle body, or the unsprung mass, that is to say substantially the wheel or the wheels with associated constituent parts. Here, active damping takes place by way of the introduction of forces into the system, but the damping does not have to take place exclusively by way of this. Rather, the electric motor drive can also be operated in an electromechanical/regenerative manner, the electric motor acting as a "braking" generator, and electric energy being generated in said generator by way of a directed braking torque, which electric energy can be stored in a rechargeable battery or can be fed to another electric consumer of the motor vehicle.

Furthermore, hydraulic vibration dampers which are customary per se are preferably provided between the vehicle body and the unsprung mass of an axle of a vehicle, which axle is configured according to the invention, said vibration dampers or shock absorbers preferably being adapted in such a way that they apply said required damping forces at those operating points, at which the active damping system which is formed by way of the abovementioned actuators cannot itself provide sufficiently high forces. Furthermore, said vibration dampers which also protect the actuators according to the invention against overloading by way of externally introduced forces can be designed so as to reduce those vibrations which are caused by way of the mass moment of inertia of said actuators. In particular in interaction with hydraulic vibration dampers of this type, the actuators can also be designed to damp vibrations (whether vibrations of the vehicle body or whether vertical vibrations of the unsprung masses of the wheel suspension systems of a vehicle axle which is designed according to the invention) in a frequency range up to the order of magnitude of 30 Hz. Otherwise, the hydraulic vibration dampers can also be semiactive dampers. For example, the vibration dampers can be configured to selectively produce two different damping force lines, namely a first in interaction with the actuators of the passive anti-roll bar and another, second damping force line for the failsafe case, that is to say if one or both actuators of an axle should fail.

It is to be briefly explained at this point why, in the present case, vertical vibrations of the wheels or the unsprung masses are admittedly mentioned, whereas only vibrations to be damped are (generally) the subject for the vehicle body. By means of the two actuators on a vehicle axle, not only can stroke movements namely be damped on the vehicle body, but rather roll movements of the vehicle body can also be influenced in a desired way, which are after all not pure vertical vibrations. If the anti-roll bar or its torsion bar were otherwise oriented in the vehicle longitudinal direction and therefore extended, for example, between the two left-hand wheels of a two-track vehicle, the pitch movements of the vehicle body might be damped by way of a damping system of this type instead of the roll movements. It goes without saying that the latter is also possible by way of anti-roll bars which are oriented in the vehicle transverse direction and are designed according to the invention if both axles of the vehicle have a damping system according to the invention. Otherwise, yaw movements of the vehicle can also be influenced in a desired way by way of a damping system according to the invention, since the distribution of the roll supporting moment between the front axle and the rear axle of the vehicle has an effect on its yaw tendency or yaw rate, as is well known. It is to be mentioned in this context as an advantage of a damping system according to the invention that a minimum damping action which is required for a driving state is ensured, in particular, by way of the proposed hydraulic vibration dampers, and a required minimum roll supporting action is ensured by way of the passive anti-roll bar. If the actuator is designed to generate a resistance torque of an appreciable level in the case of disruption just like in generator operation which has already been described, sufficient system reliability can otherwise be provided even without the hydraulic vibration dampers which are proposed optionally here.

In order, in the case of a damping system according to the invention, to design its assembly and the attachment to the vehicle to be as simple as possible, the passive anti-roll bar is of multiple-piece configuration. The anti-roll bar preferably comprises two lever elements and a torsion bar which for its part can be assembled from a plurality of individual bars which are arranged behind one another, that is to say in series, and are connected fixedly to one another so as to rotate together. The lever elements are connected by way of their end which faces away from the torsion bar to the respective wheel suspension systems. To this end, the lever elements run at least approximately in the vehicle longitudinal direction, whereas the (axle-individual) torsion bar is oriented in the vehicle transverse direction. Here, the lever elements can enclose an angle in the order of magnitude of from 70° to 110° with the torsion bar, whereby it is ensured that the torsion bar is subjected predominantly to a torsional load, whereas the lever elements are subjected substantially to a flexural load. However, the lever elements can also be configured so as to be angled away, with a larger section which extends at least approximately in the vehicle longitudinal direction and a relatively short section which extends in the vehicle transverse direction and can also be called an (abovementioned) individual bar of the torsion bar and which is adjoined either by the "actual" torsion bar or an actuator according to the invention (for example, an electric motor) with its actuator shaft. In every abovementioned case, the torsion bar connects the two lever elements of an axle (or their sections which extend at least approximately in the vehicle longitudinal direction) to one another fixedly so as to rotate together, but such that they can be twisted with respect to one another via the torsion bar about its longitudinal axis. Here, the actuator can be seated as it were on the torsion bar and can therefore apply its torque directly to the torsion bar, as it were still within the actuator. As an alternative, however, the actuator can also be arranged on an abovementioned section, which extends in the vehicle transverse direction, of an angled-away lever arm (and therefore on the corresponding individual bar of the torsion bar), and can introduce its torque directly via said lever arm of angled-away configuration into the damping system.

According to a further possible and advantageous embodiment, a section, which runs in the vehicle transverse direction, of an angled-away lever arm (or what is known as an individual bar of the torsion bar) which is assigned to a first wheel of the axle is connected to the first end of a shaft (likewise lying in the vehicle transverse direction) of the actuator or electric motor which is assigned to the first wheel, the other end of which shaft is adjoined fixedly by the torsion bar so as to rotate with it. Said torsion bar then extends as far as the actuator shaft of the actuator which is assigned to the other wheel of said axle, the other end of which actuator shaft (that is to say, the end which lies opposite the torsion bar) is adjoined by the other lever arm (for the other wheel of said axle) in a manner which is connected fixedly so as to rotate with it. It is advantageous for an embodiment of this type, in particular, if the individual bars of the torsion bar which lie within the actuators and can form said actuator shafts consist of a material with a higher strength and a lower diameter than those torsion bar individual bars outside the actuators. As a result of this, the rotational mass moment of inertia of the actuators is kept low. It is mechanically advantageous in a design of this type if the individual bars of the torsion bar which lie outside the actuators are mounted rotatably in independent anti-roll bar bearings which are customary per se.

According to a further possible embodiment, the actuator comprises a hollow shaft arrangement. Said hollow shaft arrangement has one or more hollow shafts. The anti-roll bar, more precisely its torsion bar, runs through the hollow shaft arrangement. Via a rigid connection, the hollow shaft arrangement is connected fixedly to the anti-roll bar so as to rotate with it. By means of the actuator drive, a torque can be transmitted to the hollow shaft arrangement and, from the latter, to the anti-roll bar torsion bar. Here, the hollow shaft arrangement comprises merely a hollow shaft in one simple refinement. Said hollow shaft is connected fixedly to the anti-roll bar so as to rotate with it, it being possible for said torque to be transmitted to said hollow shaft by means of the drive. As an alternative, the hollow shaft arrangement can comprise a plurality of hollow shafts which are arranged coaxially behind one another. The plurality of hollow shafts which are provided in series can be connected to one another, for example, via a gear mechanism and/or a clutch and/or a brake which can be a constituent part of an actuator according to the invention, just like the electric motor. Here, a gear mechanism permits a transmission ratio between the electric motor drive and the anti-roll bar torsion bar. The drive can be separated from the anti-roll bar via a clutch. A clutch is advantageously configured as a slipping clutch. By way of a clutch of this type, the drive and/or the gear mechanism can be protected against overloading as a result of excessively high torques or rotational speeds. A brake, in particular together with the gear mechanism, can also protect the drive or electric motor or generally the actuator against high torques and/or against excessively high rotational speeds.

It is preferably provided that a rotor of the actuator electric motor which can also be called an electric machine is arranged coaxially with respect to the anti-roll bar torsion bar or with respect to an above-described hollow shaft arrangement. Said arrangement leads to a very compact construction of the actuator, since the electric machine is seated directly on the anti-roll bar or the hollow shaft arrangement. Furthermore, a rigid attachment of the electric motor drive to the anti-roll bar is thus possible, with the result that, in particular, vibrations at relatively high frequencies (namely in the frequency range which is specified further above) can also be influenced actively by the actuators. Here, each actuator can have a dedicated housing, by way of which it is fastened to the vehicle body. As an alternative, the two actuators of one axle can also be connected mechanically to one another via a housing which is, as it were, common, but can be separated from one another with regard to their drive, in particular toward the associated lever elements. The housing is even then fastened to the vehicle body or to its undertray, and bearing points for the torsion bar or its individual bars of the anti-roll bar are preferably provided in said housing.

In the further text, the regulation of the actuators or their (electric motor) drive will be described in greater detail, to the extent that vertical vibrations of the respective wheel or what is known as the unsprung mass and/or vibrations of the vehicle body can be damped in each case in a frequency range up to the order of magnitude of from 20 Hz to 30 Hz. The regulating section or regulating loop of a damping system according to the invention advantageously comprises at least one force/torque regulator and a current regulator, to which a vehicle vertical dynamic regulator is superordinate. The force/torque regulator serves to calculate an electric setpoint current for the respective actuator electric motor. Said setpoint current is calculated in a manner which is based on a setpoint force/torque which is specified for said regulator. The setpoint force/torque specifies at least one force and/or at least one torque. The setpoint force/torque is specified by the vehicle vertical dynamic regulator and results, for example, from suitable external measured variables and/or a currently selected driving mode or a driving request. The regulating circuit of the force/torque regulator is closed by way of an actual force/torque which is determined, for example, at the actuator or at the anti-roll bar.

The force/torque regulator calculates a setpoint current as output variable. Apart from the measured actuator state variables, such as electric current, electric voltage, motor rotational speed, motor rotational angle, motor torque or power (of the electric motor), the force/torque regulator can also use state variables (or else other signals) which are measured on the vehicle. Here, the torque of the electric motor can also be estimated. Since merely one factor lies between the magnitude of the electric current for the drive and the force or the torque which is applied by way of the drive, the setpoint current can be calculated directly by way of the force/torque regulator. Furthermore, the force/torque regulator can provide a zero torque regulation which minimizes the effect of the actuator in the case of an external kinematic disruptive variable excitation. The force/torque regulator is preferably configured to compensate for the natural vibrations of the actuator mass moment of inertia in the case of both abovementioned control strategies. Here, the setpoint current serves as an input variable for the current regulator. The current regulator is connected to a supply voltage and actuates the electric motor drive. The actuation of the drive takes place in a manner which is based on the setpoint current and an electric actual current which is determined at the drive or electric motor.

In addition to the two above-described regulators, the abovementioned vehicle vertical dynamic regulator is provided as a third regulator. In said regulator, the signal processing and the calculation of that setpoint force/torque, by way of which a desired state of the vehicle body and of the unsprung masses is achieved, are executed. The calculated setpoint force/torque in turn serves as an input variable for the above-described force/torque regulator. Here, as input variables or measured variables, the vehicle vertical dynamic regulator preferably utilizes accelerations of the unsprung masses, vehicle body accelerations, build-up rates, wheel travels and/or the state variables of the actuator (current, voltage, motor rotational speed, motor rotational angle, motor torque or motor force).

The entire regulating circuit, comprising the current regulator, the force/torque regulator and preferably also the vehicle vertical dynamic regulator, preferably has a latency time of at most 3 milliseconds, in particular with regard to the desired damping of vibrations of the wheel or what is known as the unsprung mass and/or the vehicle body in a frequency range up to the order of magnitude of from 20 Hz to 30 Hz. Here, the latency time describes the delay during data transport and data calculation within the regulating circuit. It is advantageous in this context if the force/torque regulator and the vehicle vertical dynamic regulator are integrated into one another, since no additional latency times are produced hereby during the data transport between the vehicle vertical dynamic regulator and the force/torque regulator. With regard to the frequency range to be damped, the regulators should operate sufficiently rapidly and the latency time of the entire regulating loop should be kept as low as possible. For this purpose, the vehicle vertical dynamic regulator has a sampling rate of at least 400 Hz, preferably at least 800 Hz. The force/torque regulator preferably has a sampling rate of at least 1 kHz, preferably at least 2 kHz. Said values also apply in that implementation variant, in which the vehicle vertical dynamic regulator is integrated into the force/torque regulator. The current regulator preferably has a sampling rate of at least 10 kHz, in particular at least 20 kHz. And, with regard to the desired damping of relatively high frequency vehicle body vibrations and wheel vibrations (up to 30 Hz), the mechanical natural frequency of a damping system according to the invention can also be set in a targeted manner. For example, the positioning of the transmission of force between the electric motor drive and the anti-roll bar torsion bar changes the spacing of the drive from the lateral ends of the anti-roll bar and therefore the wavelength of vibrations which are ultimately transmitted via the lever elements. The mechanical natural frequency also changes as a result.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
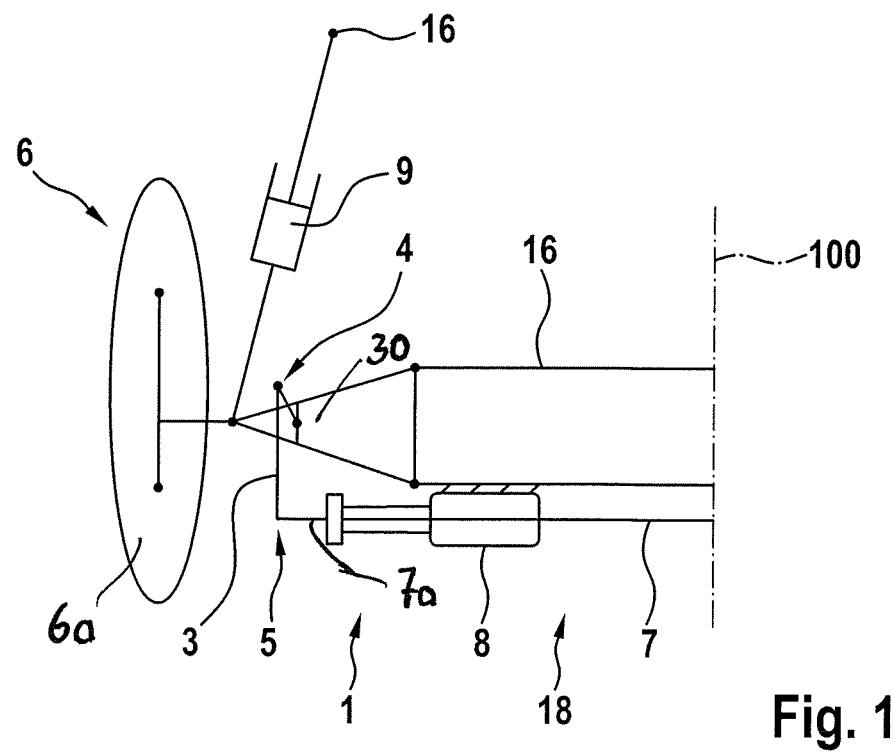
FIG. 1 shows a diagrammatic depiction of a damping system in accordance with one exemplary embodiment of the invention.

FIG. 1 shows a damping system 1 in accordance with one exemplary embodiment of the invention. The damping system 1 is, in particular, an active electromechanical/regenerative damping system. Since the damping system 1 is of symmetrical design, only one half of the damping system 1 is shown. The entire damping system 1 extends symmetrically with respect to the axis of symmetry 100 of the two-track vehicle or the vehicle axle which is shown here.

The damping system 1 includes an anti-roll (stabilizer) bar 18. The anti-roll bar 18 has a torsion bar 7 and two lever elements 3, each lever element 3 having a first end 4 and a second end 5. The first end 4 of the lever element 3 is connected to a wheel suspension system 6 or a wheel 6a (as unsprung mass) of a vehicle 2. The wheel suspension system 6 has, in particular, a wheel support which supports the wheel 6a of the vehicle, and wheel-steering elements, such as a wheel-steering link 30. Therefore, a compression movement or a rebound movement of the wheel 6a in the vertical direction or vehicle vertical axial direction leads to a rotational movement of the lever element 3 about the axis of the torsion bar 7 or about a rotational axis which runs in the vehicle transverse direction, the end 4 of the lever element 3 being moved substantially in the vertical direction.

At its second end 5, the lever element 3 is connected fixedly to the torsion bar 7 so as to rotate with it. Therefore, the abovementioned movement of the wheel 6a leads to a torsion of the torsion bar 7. For the optimum transmission of force and for optimum stability, the lever elements 3 and the torsion bar 7 are connected fixedly to one another so as to rotate together.

The anti-roll bar 18 is formed in practice by way of a conventional passive anti-roll bar. A compression movement or a rebound movement of the left-hand wheel 6 which is shown here would thus lead without any further influences to an analogous movement of the right-hand vehicle wheel on the other side of the axis of symmetry 100, since the movement of the lever element 3 which is on the left-hand side here is transmitted by way of the torsion bar 7 to the opposite lever element (on the right-hand side in the vehicle). In particular, however, a roll movement of the vehicle body 16 with respect to the vehicle wheels 6a is damped by way of the passive anti-roll bar, in the case of which roll movement, for example, the wheel 6a on the left-hand side rebounds with respect to the vehicle body 16, whereas the right-hand side vehicle wheel compresses with respect to the vehicle body 16. A stabilization moment for passive roll support is fixed by way of a suitable selection of the torsional stiffness of the torsion bar 7.

In addition, in each case one actuator 8 is provided per wheel suspension system 6, that is to say for the left-hand side wheel 6a and for the right-hand side wheel which lies on the other side of the axis of symmetry 100 of said vehicle axle. The actuator 8 is arranged or fastened or supported on the vehicle body 16. Otherwise, the vehicle body 16 represents the sprung mass of the vehicle 2 (whereas, in particular, the wheel 6a with associated elements is the unsprung mass).

The actuator 8 serves, inter alia, as a bearing element for the anti-roll bar 18, but, in particular, for applying a torque to the torsion bar 7 and, in particular, to that section 7a of the torsion bar 7 or anti-roll bar 18 which lies closest to the wheel 6a which is adjacent with respect to the actuator 8. Said torque which can be applied serves, in particular, to rotate the lever element 3 which lies in each case closest to the respective actuator 8, and therefore to move its first end 4 substantially in the vertical direction, that is to say in the direction of the vehicle vertical axis. For this purpose, each lever element 3 is therefore assigned an actuator 8. Here, the actuator 8 is situated in the spatial vicinity of the lever element 3, with the result that an application of torque results virtually directly in a movement of the associated lever element 3. Therefore, torques which have been applied to the anti-roll bar 18 by the other actuator or which have been generated by way of an externally excited rotation of the other actuator or the other lever element (that is to say, which lies on the other side of the axis of symmetry 100) can be compensated for by way of the one actuator 8. In this way, the vertical movements or vertical vibrations of two wheel suspension systems 6 or wheels 6a of a vehicle axle which lie opposite one another and are connected to one another via the anti-roll bar 18 can be set or regulated or damped in a regulated manner, in particular, even independently of one another. Moreover, there is one shock absorber 9 per wheel 6a in order to assist the actuator 8 during damping of vertical movements of the wheel 6a with respect to the vehicle body 16. The wheel compression movements and wheel rebound movements can be damped substantially as is customary by way of the shock absorber or absorbers 9.

Figure 2:
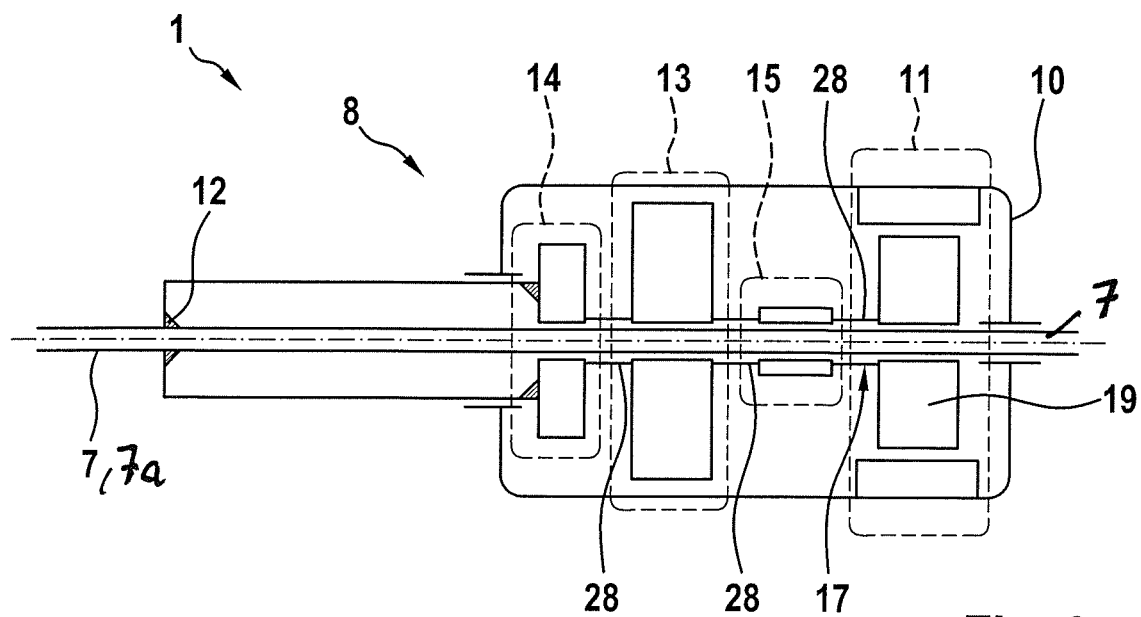
FIG. 2 shows a diagrammatic illustration of an actuator of the damping system in accordance with the exemplary embodiment of the invention.

One possible embodiment of an actuator 8 according to the invention is shown in detail in FIG. 2. The actuator 8 thus includes a drive 11. The drive 11 is an electric machine or an electric motor which can also be operated as a generator. The anti-roll bar 18 is mounted in the drive 11 via a hollow shaft arrangement 17. To this end, the drive 11 has a rotor 19. The rotor 19 is seated coaxially on the hollow shaft arrangement 17. The torsion bar 7 of the anti-roll bar 18 is in turn plugged in the hollow shaft arrangement 17.

A gear mechanism 13 which advantageously drives a slip clutch 14 can be driven by way of the drive 11. The slip clutch 14 is ultimately connected via a connection 12 to the torsion bar 7. It is therefore made possible for the drive 11 to apply a torque to the torsion bar 7 via the slip clutch 14 and via the gear mechanism 13. As an alternative, the slip clutch 14 can be dispensed with, with the result that the drive 11 applies a torque to the torsion bar 7 merely via the gear mechanism 13. As has been described above, an application of torque to the anti-roll bar 18 brings about a rotation of the lever element 3. The actuator 8 can therefore actively influence a movement of the lever element 3 via the drive 11.

Furthermore, there is a brake 15 here, by way of which a movement of the actuator 8 can be braked. Should there be an excessively high rotational speed at the drive 11, the drive 11 can thus be protected via the brake 15 and the slip clutch 14. Should the drive 11 be deactivated, the passive damping action and friction of the actuator 8 and a stabilizing moment of the torsion bar 7 thus remain.

The hollow shaft arrangement 17 includes a plurality of hollow shafts 28 which are arranged coaxially behind one another, that is to say in series, and are connected fixedly to one another so as to rotate together. Via said hollow shafts 28, the individual elements such as the drive 11, brake 15, gear mechanism 13 and clutch 14 are therefore coupled fixedly among one another so as to rotate together.

Figure 3:
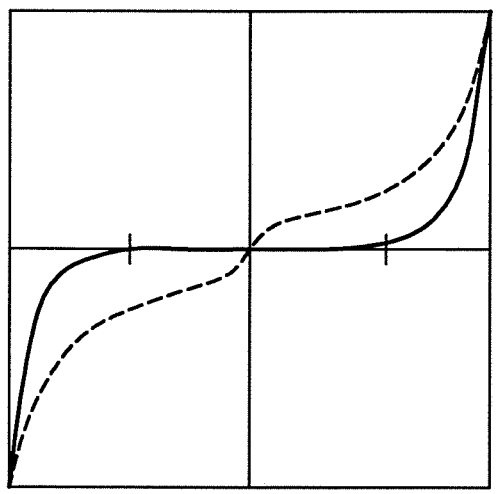
FIG. 3 shows a diagrammatic illustration of a damping characteristic of a shock absorber of the damping system in accordance with the exemplary embodiment, without influence of the actuator.
Figure 4:
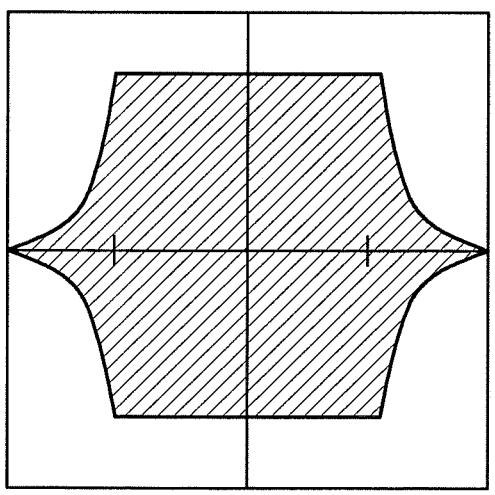
FIG. 4 shows a diagrammatic depiction of a characteristic of the actuator of the damping system in accordance with the exemplary embodiment of the invention.

The passive damping action of the shock absorber 9 has a characteristic which is adapted to the actuator 8. Thus, FIG. 3 shows a damping characteristic of the shock absorber 9, a speed being plotted on the abscissa, whereas the ordinate shows a force. FIG. 4 shows the characteristic of the drive 11 of the actuator 8, an angular speed being plotted via the abscissa and a torque being plotted via the ordinate. As can be seen, only the damping characteristic which is shown diagrammatically in FIG. 3 can also be generated solely by way of shock absorbers 9 or by way of hydraulic vibration dampers in the wheel suspension systems of a motor vehicle, whereas the damping behavior which is shown in FIG. 4 can be provided by way of a damping system according to the invention, and there is therefore a considerably more versatile possibility for providing damping forces via speeds or vibrations of the vehicle body 16 and/or the wheels 6a of the vehicle, advantageously up to frequencies in the order of magnitude of from 20 Hz to 30 Hz.

Figure 5:
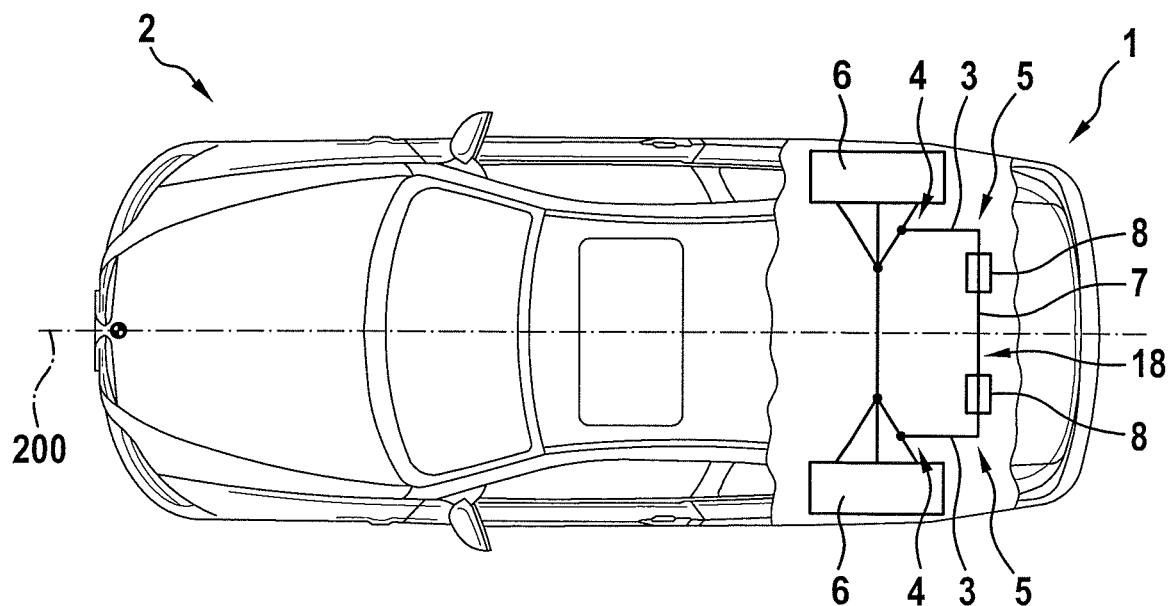
FIG. 5 shows a diagrammatic illustration of a vehicle having a damping system in accordance with the exemplary embodiment of the invention.

FIG. 5 shows a vehicle 2 having the active damping system 1, only for the vehicle rear axle here. Here, the damping system 1 corresponds to the damping system 1 which has been described above and is shown in FIG. 1 and in FIG. 2. It goes without saying that an analogous damping system 1 can also be arranged on the vehicle front axle or provided for the vehicle front axle.

Figure 6:
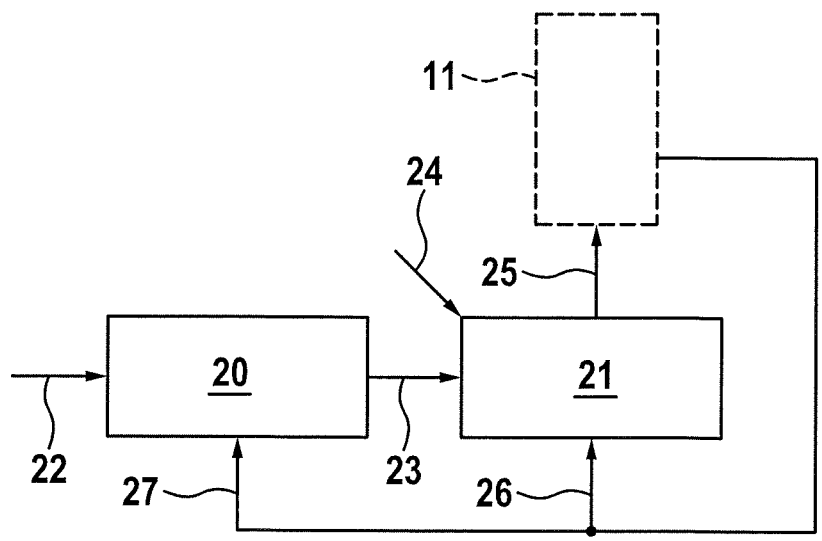
FIG. 6 shows a regulation of the damping system in accordance with the exemplary embodiment of the invention.

FIG. 6 shows a diagrammatic illustration of the regulation of the drive 11 of the actuator 8. A force/torque regulator 20 serves to calculate a setpoint current 23. The setpoint current 23 is calculated in a manner which is based on a setpoint force/torque which is forwarded to the force/torque regulator 20 via the interface 22. The setpoint force/torque is specified by a superordinate vehicle vertical dynamic regulator, that is to say is calculated in the vehicle, and results, for example, from external measured variables, a driving mode, a driving request, etc. The vehicle vertical dynamic regulator can be implemented together with the force/torque regulator 20 in the same electronic control unit. Apart from the setpoint force/torque, other variables which are measured on the vehicle or are calculated or estimated in other control units can also be forwarded to the force/torque regulator 20 via the interface 22.

The regulating circuit of the force/torque regulator 20 is closed by way of an actual force/torque 27 which is determined, for example, at the actuator 8 or at the anti-roll bar 18. The force/torque regulator 20 calculates the setpoint current 23 as an output variable. The setpoint current 23 serves as an input variable for a current regulator 21. The current regulator 21 is connected to an electric supply voltage 24 and actuates the drive 11. The actuation of the drive 11 takes place in a manner which is based on the electric setpoint current 23 and an electric actual current 26 which is determined at the drive 11.

A regulating capability of vibrations at high frequencies, namely in the specified frequency range of up to 30 Hz, is ensured by way of the configuration and integration of the active damping system 1 in the vehicle 2. Since the damping forces are transmitted into the vehicle body 16 in parallel via the shock absorber 9 but also via the housing 10 of the actuator 8 and via the end 4 of the lever element 3, said components are loaded to a lesser extent than in the case of similar systems, where all forces are transmitted mostly only via the shock absorber 9.

There is no risk of oversteer or an inclination to tilt for the vehicle even in the fallback mode, in which the actuator 8 is switched off on account of a fault or on account of overloading, since the shock absorbers 9 and the anti-roll bar 18 generate sufficient and coordinated forces which also continue to ensure corresponding passive safety. For this reason, the functionality of the actuator 8 is not necessary, in order to guarantee the passive safety of the vehicle. The controllability of the vehicle 2 is therefore ensured in all driving situations, even in the fallback mode.

Furthermore, the selection of the mechanical stiffness of the active damping system 1 or its natural frequency makes decoupling of the natural frequency from that of the unsprung mass of the vehicle 2 possible. Possible mutual influencing of the resonance incidents of the individual systems is avoided as a result. This ensures that the actuator or actuators 8 can still be regulated even at relatively high frequencies. If the two abovementioned resonances namely do not act in a boosted manner, the vibrations to be compensated for are lower, and the actuator 8 is therefore capable even at relatively high frequencies of damping existing vibrations to a sufficient extent by way of its available performance. Moreover, the active damping system 1 according to the invention is sufficiently rapid, in order to make effective energy recuperation possible from the vibrations of sprung and unsprung masses, it also being advantageous here if the actuator requires as little energy as possible for damping its own vibrations, which can be taken into consideration in its design in a suitable manner with regard to the natural frequency.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A damping system of a two-track vehicle, comprising:
    a passive anti-roll bar having a torsion bar extending in a vehicle transverse direction and having lever elements adjoining said torsion bar on end sides thereof, the lever elements being connected to mutually opposite wheel suspension systems of an axle of the vehicle;
    two actuators mounted on a body of the vehicle, each of said actuators being assigned to a respective wheel of a wheel suspension system and having in each case one drive via which a torque is appliable to a section of the anti-roll bar facing the respective wheel, wherein
        the two actuators are electric motors and are configured, by way of suitable regulation of their respective drives and therefore also by way of active introduction of forces, to damp vertical vibrations of the respective wheel and/or vibrations of the vehicle body in a frequency range between 0 Hz and at least 20 Hz, and
        the torsion bar comprises a first plurality of individual bars which lie within the actuators and comprise a material with a higher strength and a lower diameter than a second plurality of individual bars which lie outside the actuators.

2. The damping system as claimed in claim 1, further comprising:
    hydraulic vibration dampers connected in parallel to the actuators one of said hydraulic vibration dampers being provided in each of said wheel suspension systems, wherein
    the actuators are designed, by way of suitable regulation of the drives in interaction with the suitably designed hydraulic vibration dampers, to damp the vertical vibrations of the respective wheel and/or vibrations of the vehicle body in a frequency range up to an order of magnitude of 30 Hz.

3. The damping system as claimed in claim 1, wherein the regulation of the drive of the actuator is designed in a two-axle vehicle to reduce an influence of vehicle body movements of travel, roll, pitch and/or yaw.

4. The damping system as claimed in claim 1, wherein the first or second plurality of individual bars are arranged in series and are connected to one another fixedly so as to rotate together, and
    the anti-roll bar comprises the torsion bar and the lever elements which are connected fixedly to the torsion bar on end sides.

5. The damping system as claimed in claim 1, wherein regulation of the drives of the actuators also allows for generation of electric energy by way of generator operation of the electric motors.

6. A method for operating a damping system of a two-track vehicle as claimed in claim 1, wherein the method comprises the steps of:
    regulating the drives of the actuators; and
    dampening vertical vibrations of the respective wheels and/or vibrations of the vehicle body in a frequency range between 0 Hz and at least 20 Hz based upon the regulation of the respective drives.

7. The damping system as claimed in claim 1, wherein each of said actuators comprises a hollow shaft arrangement, to which a torque can be transmitted via a rotor, arranged coaxially with respect thereto, of the drive or actuator, and through which the hollow shaft arrangement the torsion bar of the anti-roll bar runs which is connected via a connection fixedly to the hollow shaft arrangement so as to rotate with it.

8. The damping system as claimed in claim 7, wherein a gear mechanism, a clutch and/or a brake are provided in the hollow shaft arrangement between the drive and said connection.

9. The damping system as claimed in claim 1, further comprising:
    a superordinate vehicle vertical dynamic regulator which, with regard to a desired reduction of vibrations of the vehicle body, determines a setpoint torque or a setpoint force for the drives of the actuators, from which a force/torque regulator determines an electric setpoint current which a current regulator sets at the drives of the actuators.

10. The damping system as claimed in claim 9, wherein the force/torque regulator has a sampling rate of at least 1 kHz and/or the current regulator has a sampling rate of at least 10 kHz.

11. The damping system as claimed in claim 10, wherein the sampling rate of the force/torque regulator is at least 2 kHz and/or the sampling rate of the current regulator is at least 20 kHz.

12. A damping system of a two-track vehicle, comprising:
a passive anti-roll bar having a torsion bar extending in a vehicle transverse direction and having lever elements adjoining said torsion bar on end sides thereof, the lever elements being connected to mutually opposite wheel suspension systems of an axle of the vehicle;
two actuators mounted on a body of the vehicle, each of the actuators being assigned to a respective wheel and having in each case one drive via which a torque is applicable to a section of the anti-roll bar facing the respective wheel, wherein
the two actuators are electric motors and are configured, by way of suitable regulation of the respective drives and therefore also by way of active introduction of forces, to damp vertical vibrations of the respective wheel and/or vibrations of the vehicle body in a frequency range between 0 Hz and at least 20 Hz, and
the torsion bar comprises one or more first individual bars which lie within the actuators and comprise a material with a higher strength and a lower diameter than one or more second individual bars which lie outside the actuators.

* * * * *